United States Patent Office 2,851,498
Patented Sept. 9, 1958

2,851,498

PURIFICATION OF 2,5-DICHLOROSTYRENE

Robert R. Dreisbach, John F. Mulloy, and Fred J. Lowes, Midland, Mich., assignors to The Dow Chemical Company, Midland, Mich., a corporation of Delaware No Drawing. Application October 10, 1955
Serial No. 539,682

3 Claims. (Cl. 260—650)

This invention relates to the preparation of substantially pure 2,5-dichlorostyrene. It pertains especially to a method for the preparation of substantially pure 2,5-dichlorostyrene from mixtures thereof with impurities incidental to its formation from 2,5-dichloroethylbenzene.

2,5-dichlorostyrene can be made by catalytic dehydrogenation of 2,5-dichloroethylbenzene according to the equation:

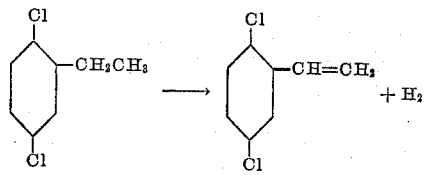

Because only a part of the starting material is converted in the manner just shown, the resulting reaction product is a mixture comprising the desired 2,5-dichlorostyrene, unreacted 2,5-dichloroethylbenzene, and at least traces of by-products, tars and the like. It is extremely difficult to obtain a substantially pure 2,5-dichlorostyrene from this mixture by fractional distillation alone. The 2,5-dichlorostyrene is not easily separated from close-boiling impurities. Furthermore, the 2,5-dichlorostyrene polymerizes very readily, and does so rapidly when attempts are made to distill the mixture through a fractional distillation column.

It is an object of this invention to provide a method for the preparation of substantially pure 2,5-dichlorostyrene.

A more particular object is to provide such a method for the preparation of substantially pure 2,5-dichlorostyrene from mixtures thereof with impurities incidental to its formation from 2,5-dichloroethylbenzene.

A specific object is to provide such a method for the preparation of substantially pure 2,5-dichlorostyrene from mixtures comprising the same and 2,5-dichloroethylbenzene.

Other objects and advantages of the invention will be evident in the following description.

The objects of this invention have been attained in a method that comprises these procedural steps:

A. A mixture comprising 2,5-dichlorostyrene and impurities, e. g., impurities incidental to its formation by dehydrogenation of 2,5-dichloroethylbenzene, is chlorinated with molecular chlorine, whereby the 2,5-dichlorostyrene is converted to 1,4-dichloro-2-(1,2-dichloroethyl)benzene according to the equation:

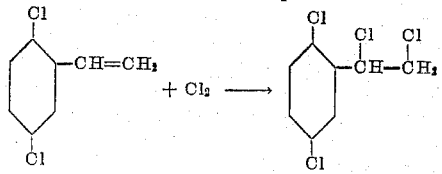

B. The chlorination reaction mixture is subjected to efficient fractional distillation to obtain a fraction that is substantially free of material boiling appreciably higher or lower than 1,4-dichloro-2-(1,2-dichloroethyl)benzene.

C. The 1,4-dichloro-2-(1,2-dichloroethyl)benzene is dechlorinated by reaction with zinc, whereby 2,5-dichlorostyrene is regenerated.

D. The 2,5-dichlorostyrene is separated from the resulting reaction mixture, and further purified, preferably by rapid distillation under reduced pressure, to obtain a substantially pure 2,5-dichlorostyrene.

The first step of the process of the invention can be carried out by contacting a molecular chlorine-containing gas with a liquid mixture comprising 2,5-dichlorostyrene, e. g. 2,5-dichlorostyrene containing impurities incidental to its manufacture, such as 2,5-dichloroethylbenzene. Other liquid diluent that are less readily chlorinated than 2,5-dichlorostyrene can be added as media for the chlorination reaction, if desired. The chlorination must be carried out in the absence of catalysts that promote chlorination of the nucleus of aromatic compounds. The reaction, which can be conducted with or without exposure to light, can be carried out over a wide range of temperatures, e. g. from −70° C., or below, to temperatures at which the rate and extent of polymerization of 2,5-dichlorostyrene becomes excessive or disadvantageous, preferably between 0° and about +70° C.

By the procedure just suggested, most of the 2,5-dichlorostyrene is chlorinated by addition of chlorine to the unsaturated vinyl side chain according to the equation:

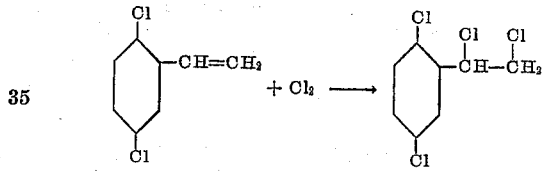

to form 1,4-dichloro-2-(1,2-dichloroethyl)benzene. However, about one-third of the 2,5-dichlorostyrene in the starting material is usually chlorinated by substitution according to the equation:

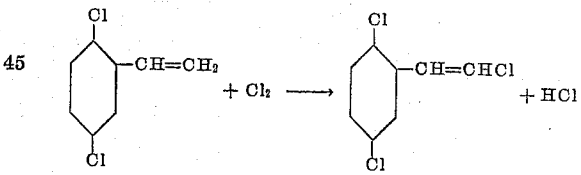

to form β,2,5-trichlorostyrene. A chlorination reaction mixture comprising these products, i. e. 1,4-dichloro-2-(1,2-dichloroethyl)benzene and β,2,5-trichlorostyrene, can be employed in further steps of this process as described below. However, the ultimate recovery of purified 2,5-dichlorostyrene is diminished by the conversion of 2,5-dichlorostyrene to β,2,5-trichlorostyrene in this chlorination step.

In a copending application, Serial Number 533,497, filed September 9, 1955, by Robert R. Dreisbach, John F. Mulloy and Fred J. Lowes, now U. S. Patent 2,829,178, there is described an improved method for chlorination of 2,5-dichlorostyrene whereby the formation of β,2,5-trichlorostyrene is substantially prevented. The method of that application comprises contacting 2,5-dichlorostyrene in a liquid form with molecular chlorine in the presence of an absorbent carbon such as wood charcoal. In the present process it is preferable to carry out the step of chlorination of 2,5-dichlorostyrene with molecular chlorine in the presence of absorbent carbon such as wood charcoal, other conditions of the chlorination being as described above, whereby the 2,5-dichlorostyrene in the starting material is converted substantially to 1,4-dichloro-2-(1,2-dichloroethyl)benzene.

The reaction mixture resulting from the chlorination just described, is then treated, preferably by fractional distillation, to separate therefrom the 1,4-dichloro-2-(1,2-dichloroethyl)benzene. The 1,4-dichloro-2-(1,2-dichloroethyl)-benzene is much higher boiling than are the impurities, present in the starting material, that boil close to 2,5-dichlorostyrene and that are difficult to separate from the latter by distillation. Such materials, e. g. 2,5-dichloroethylbenzene, are readily fractionally distilled as a fore-fraction from the 1,4-dichloro-2-(1,2- dichloroethyl)-benzene. Other materials, formed during the chlorination reaction, such as β,2,5-trichlorostyrene, that boil at lower temperatures than 1,4-dichloro-2-(1,2-dichloroethyl) benzene, can also be removed in distillate fore-fractions from the 1,4-dichloro-2 - (1,2 - dichloroethyl)benzene. Although the 1,4-dichloro-2-(1,2-dichloroethyl)benzene is quite stable, the fractional distillation is preferably carried out at reduced pressure, i. e. under vacuum, such that the temperature of the residue does not appreciably exceed about 150° C. during the distillation.

After fractional distillation of the lower-boiling materials, the 1,4-dichloro-2-(1,2-dichloroethyl)benzene is preferably distilled to obtain a distillate fraction substantially free of materials boiling appreciably higher or lower than 1,4-dichloro-2-(1,2-dichloroethyl)benzene.

The 1,4-dichloro-2-(1,2-dichloroethyl)benzene is then dechlorinated with zinc according to the equation:

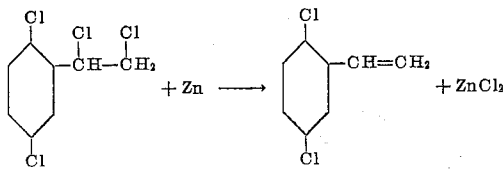

whereby 2,5-dichlorostyrene is regenerated. The reaction is carried out by contacting the 1,4-dichloro-2-(1,2-dichloroethyl)benzene distillate fraction with metallic zinc, in the presence of a water-soluble lower aliphatic alcohol such as methanol, ethanol, or isopropanol. One means for carrying out the operation comprises suspending pieces of zinc in an alcohol with agitation under reflux, and feeding the 1,4-dichloro-2-(1,2-dichloroethyl)benzene to the resulting suspension. Another means for carrying out the operation comprises placing the pieces of zinc as a permeable bed or packing in a tube and passing a mixture of the 1,4-dichloro-2-(1,2-dichloroethyl)benzene and alcohol over the zinc. The zinc can be in any kind of pieces such as granules, lumps, "mossy zinc," powder, or clippings of sheet, strip or rod. Usually, fine pieces are preferred when the pieces are suspended in a liquid reaction mixture, and coarse pieces are preferred for use in packed tubes. The proportion of alcohol used is not critical but is usually at least one part by volume of alcohol per part of 1,4-dichloro-2-(1,2-dichloroethyl)-benzene. The zinc is usually charged in large excess over the amount theoretically required to dechlorinate the side chain of the 1,4-dichloro-2-(1,2-dichloroethyl)benzene, and the unreacted portion of zinc is recovered for use in succeeding runs. The reaction can be carried out within a wide range of temperatures, preferably between room temperature and about 100° C. At atmospheric pressure it is convenient to operate under reflux and at the reflux temperature of the alcohol medium, the refluxing of which serves to control the temperature. Since 2,5-dichlorostyrene readily polymerizes, it is desirable to carry out these operations in the presence of a polymerization retarder or inhibitor, such as p-tert-butylcatechol.

An especially advantageous mode of operation for dechlorination of the 1,4-dichloro-2-(1,2-dichloroethyl)-benzene is a continuous one that is carried out as follows. A bed of zinc metal pieces is placed in a vertical column or tower that is open at the top for charging more zinc pieces. Through one or more inlets positioned nearly midway of the length of the metal-packed column is continuously fed a solution of 1,4-dichloro-2-(1,2-dichloroethyl)benzene in a water-soluble lower aliphatic alcohol. Cooling means are provided in the portion of the metal-packed column above the point of feed of the alcohol solution. Means are provided at the bottom of the column, e. g. a screened line, for drawing off the liquid portion of the reaction mixture while substantially retaining the metal pieces in the column. In operation, the dechlorination reaction occurs principally in the portion of the column below the point of feed of the alcohol solution, thereby generating heat that causes the alcohol to reflux. The alcohol vapors are cooled and condensed in the upper portion of the metal bed above the liquid feed inlet, and liquid condensate runs back down the column. More zinc metal pieces can easily be charged intermittently or continuously as needed into the open top end of the column without need for complicated seals. The vapors and condensate of the refluxing alcohol in the metal bed performs an additionally advantageous service in cleansing and degreasing the metal, thereby activating the metal for reaction with the 1,2-dicholoro-2-(1,2-dichloroethyl)benzene in the lower portion of the column. The liquid reaction mixture is continuously withdrawn from the bottom of the column.

The resulting reaction mixture contains 2,5-dichlorostyrene, alcohol, and zinc chloride. The 2,5-dichlorostyrene can be separated therefrom, preferably by admixing the reaction mixture with acidulated water, e. g. with dilute hydrochloric acid, other dilute hydrohalogen acids, or dilute sulfuric acid. There is usually used at least one volume, preferably from 5 to 10 or more volumes, of acidulated water per volume of the starting mixture of 2,5-dichlorostyrene, alcohol, and zinc chloride. There are thereby formed an oil layer consisting principally of 2,5-dichlorostyrene and a water layer containing zinc chloride, alcohol, and acid. The oil layer can be withdrawn, dehydrated, and neutralized, e. g. by contact with anhydrous sodium carbonate. The 2,5-dichlorostyrene can be further purified by flash distillation under reduced pressure and in the presence of polymerization inhibitors or retarders to separate traces of tarry materials and to obtain a substantially pure 2,5-dichlorostyrene.

All of the steps of the process can be, and preferably are, carried out in continuous manner.

The following example illustrates the invention, but should not be construed as limiting its scope. In the example, percentages are by weight unless otherwise noted.

Into a vertical, water-jacketed glass column 1.5 inches in diameter and 36 inches long was charged 354 grams of wood charcoal in coarse, irregular pieces. Into the top of the column was charged a liquid solution of 2,5-dichlorostyrene at an average rate of 1300 grams per hour. The 2,5-dichlorostyrene solution was the flash-distilled reaction mixture obtained by catalytic partial dehydrogenation of a technical grade of 2,5-dichloroethylbenzene. It contained approximately 80 percent 2,5-dichloroethylbenzene and about 2 percent 2,6-dichloroethylbenzene, the remainder being principally 2,5-dichlorostyrene. At the stated rate of feed, the liquid material trickled downward over the charcoal packing without flooding the column, and was withdrawn through a liquid seal at the bottom of the column. Gaseous chlorine was fed into the column, at a point near the bottom of the charcoal packing and above the liquid seal, at an average rate of 135 grams per hour. An unreacted excess of chlorine escaped through a vent at the top of the column. The average temperature in the reaction zone was about 20° C.

After six hours of operation, a sample of the chlorinated reaction mixture was taken and analyzed as follows:

Specific gravity at 60°/60° F. _____ 1.275
1,4-dichloro-2-(1,2-dichloroethyl)benzene
          Percent__ 22
2,5-dichloroethylbenzene _____do____ 76
2,6-dichloroethylbenzene _____do____ About 2
2,5-dichlorostyrene _____ Trace The liquid chlorinated reaction mixture was washed with dilute sodium carbonate aqueous solution, dried over calcium chloride, and filtered. The neutral material was fractionally distilled under reduced pressure. Substantially pure 1,4-dichloro-2-(1,2-dichloroethyl)benzene was collected in a fraction boiling in the temperature range from 85° to 86° C. at about 0.3 mm. of mercury, absolute pressure.

A vertical column was packed with pieces of mossy zinc metal and provided at its upper end with a reflux condenser and a dropping funnel. A mixture of two volumes of methanol and one volume of distilled 1,4-dichloro-2-(1,2-dichloroethyl)benzene, containing about 1 percent of p-tert-butylcatechol, was fed into the top of the column and caused to trickle down over the pieces of zinc. Heat of the reaction caused the methanol to reflux.

The effluent from the zinc column was admixed with about five volumes of cold dilute, hydrochloric acid aqueous solution, whereupon two layers were formed, viz, an organic oil layer and an aqueous layer comprising methanol, zinc chloride and hydrochloric acid. The organic oil layer was withdrawn, stirred with anhydrous sodium carbonate, and filtered.

To the neutral oil filtrate was added about 1 percent of 4,6-dinitro-o-cresol, and the material was fractionally distilled under reduced pressure through a short distillation column. Substantially pure 2,5-dichlorostyrene was obtained in a distillate fraction boiling from 75° to 85° C. at from 2 to 5 mm. of mercury, absolute pressure. The recovery of substantially pure 2,5-dichlorostyrene corresponded to about 90 percent of theoretical based on the 2,5-dichlorostyrene in the crude starting material.

We claim:

1. A method which comprises chlorinating a mixture consisting essentially of 2,5-dichlorostyrene, 2,5-dichloroethylbenzene, and close-boiling impurities incidental to the manufacture of 2,5-dichlorostyrene from 2,5-dichloroethylbenzene by adding chlorine to that mixture at temperatures between −70° and +70° C., in the presence of absorbent carbon while excluding catalysts that promote chlorination of aromatic nuclei to obtain substantial conversion of the 2,5-dichlorostyrene to 1,4-dichloro-2-(1,2-dichloroethyl)benzene, fractionally distilling the resulting reaction mixture to obtain a 1,4-dichloro-2-(1,2-dichloroethyl)benzene fraction substantially free of materials boiling appreciably higher and lower than 1,4-dichloro-2-(1,2-dichloroethyl)benzene, contacting the 1,4-dichloro-2-(1,2-dichloroethyl)benzene fraction with zinc metal in the presence of a water-soluble aliphatic alcohol at temperatures between room temperature and 100° C. to obtain substantial conversion of the 1,4-dichloro-2-(1,2-dichloroethyl)benzene to 2,5-dichlorostyrene, diluting the liquid portion of the resulting reaction mixture with dilute hydrochloric acid aqueous solution to obtain an organic oil layer and an aqueous layer, dehydrating and neutralizing the organic oil layer and fractionally distilling the resulting organic oil under vacuum to obtain a distillate fraction consisting essentially of 2,5-dichlorostyrene.

2. A method according to claim 1 wherein the operations are carried out in continuous manner.

3. A method which comprises chlorinating a mixture consisting essentially of 2,5-dichlorostyrene and 2,5-dichloroethylbenzene by adding chlorine to that mixture at temperatures between −70° and +70° C., while excluding catalysts that promote chlorination of aromatic nuclei, to obtain substantial conversion of the 2,5-dichlorostyrene to 1,4-dichloro-2-(1,2-dichloroethylbenzene, fractionally distilling the resulting reaction mixture to obtain a 1,4-dichloro-2-(1,2-dichloroethyl)benzene fraction substantially free of materials boiling appreciably higher and lower than 1,4-dichloro-2-(1,2-dichloroethyl)benzene, contacting the 1,4 - dichloro - 2 - (1,2-dichloroethyl)benzene fraction with zinc metal in the presence of a water-soluble aliphatic alcohol to obtain substantial conversion of the 1,4-dichloro-2-(1,2-dichloroethyl)benzene to 2,5-dichlorostyrene, and recovering the 2,5-dichlorostyrene from the resulting reaction mixture.

References Cited in the file of this patent
UNITED STATES PATENTS
2,576,666    Bluestone et al. _____ Nov. 27, 1951

OTHER REFERENCES

Huntress: "Organic Chlorine Compounds," page 894 (1948).

Emerson et al.: "Jour. Am. Chem. Soc.," vol. 67, pages 518–520 (1945).